United States Patent
Hummel

(10) Patent No.: US 7,184,405 B1
(45) Date of Patent: Feb. 27, 2007

(54) METHOD FOR SETTING UP A COMMUNICATION LINK IN A TELECOMMUNICATION NETWORK

(75) Inventor: Heinrich Hummel, Guending (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,776

(22) PCT Filed: Oct. 1, 1999

(86) PCT No.: PCT/DE99/03179

§ 371 (c)(1), (2), (4) Date: Jul. 9, 2001

(87) PCT Pub. No.: WO00/21328

PCT Pub. Date: Apr. 13, 2000

(30) Foreign Application Priority Data

Oct. 5, 1998 (DE) ................. 198 45 753

(51) Int. Cl.
*H04L 12/16* (2006.01)

(52) U.S. Cl. .................................. 370/236
(58) Field of Classification Search ..... 370/236–238.1, 370/398–395.32
See application file for complete search history.

(56) References Cited

U.S. PATENT DOCUMENTS 5,649,108 A 7/1997 Spiegel et al.
6,185,210 B1 * 2/2001 Troxel ................. 370/395.32
6,496,479 B1 * 12/2002 Shionozaki ............... 370/230

FOREIGN PATENT DOCUMENTS

WO 98/4415 8/1998

OTHER PUBLICATIONS

Schwarz, Mischa: Telecommunication Networks: Protocols, Modeling and Analysis, 1987, Addison Wesley, Reading Massachusetts, pp. 291-292.

* cited by examiner

*Primary Examiner*—Doris H. To
*Assistant Examiner*—Thai Hoang
(74) *Attorney, Agent, or Firm*—Morrison & Foerster LLP

(57) ABSTRACT

To set up a connection in a communication network comprising a multiplicity of network nodes connected via links, a setup message is transmitted from an originating network node to a destination network node. In this process, a route-specific forwarding information item included in the setup message is read out in a network node receiving a setup message, by means of which information item the setup message is forwarded via a link allocated to this route-specific forwarding information item in this network node.

14 Claims, 3 Drawing Sheets

PRIOR ART

METHOD FOR SETTING UP A COMMUNICATION LINK IN A TELECOMMUNICATION NETWORK

This application claims priority to International Application No. PCT/DE99/03179 which was published in the German language on Oct. 1, 1999.

TECHNICAL FIELD OF THE INVENTION

The invention relates to a method for setting up a connection for a communication network, and in particular, to a method for setting up a connection for a communication network including a multiplicity of network nodes networked via links.

BACKGROUND OF THE INVENTION

At present, there are a variety of connectionless and connection-oriented transmission methods which are used for rapidly transmitting data packets via a communication network.

The so-called MPLS (multiprotocol label switching) method is used as a connectionless transmission method where an acceleration of the transmission of so-called IP data packets based on the Internet protocol (IP) is to be achieved. In this method, so-called label switching routers (LSR) are provided which can transmit IP data packets at high speed along a route consisting of label switching routers. A conventional router based on the Internet protocol must compare a destination IP address of a received IP data packet with entries in its routing table in order to determine, via a so-called longest match, the link via which the IP data packet is to be forwarded. A label switching router, in contrast, receives the IP data packet together with a prefixed label and uses this label as table index in order to take from a table the information for identifying the link for forwarding the IP data packet and a new label which is forwarded together with the IP data packet instead of the received label. In this manner, IP data packets can be forwarded much more rapidly.

FIG. 1 illustrates a setup message for an ATM connection in the form of a so-called μ setup message ATMZ according to the prior art. The μ setup message ATMZ has a 48-byte-large payload area which is shown in 6 rows in each case comprising 8 bytes. Data field T contains an information element defining the type of the ATM cell, data field Q contains a connection parameter by means of which individual characteristics of the connection to be set up are specified, data fields NSAP contain the address of the destination network node, data field PID contains a so-called protocol identifier and data field VPI/VCI contains a proposed value for the so-called virtual path identifier VPI and the so-called virtual connection identifier VCI for the ATM cells to be transmitted in the useful data connection to be set up.

SUMMARY OF THE INVENTION

In one embodiment of the invention, there is a method for setting up a connection for a communication network having a multiplicity of network nodes networked via links. The method includes, for example, determining routes to destination network nodes of connection destinations for the network nodes, allocating, in the network nodes, an allocation rule by means of the routes determined, by means of which rule a forwarding information item is allocated both to a link leading in the direction of this destination node and to a new forwarding information item for each destination network node and transmitting a setup message from an originating network node to the destination network nodes for preparing a subsequent transmission of data, such that in a network node receiving the setup message. The method of forwarding a information item included in the setup message is read out and using the allocation rule, the setup message is forwarded via a link allocated to this forwarding information item in this network node, after replacement of this forwarding information item by a new forwarding information item allocated to the former information item.

In one aspect of the invention, before the setup message is transmitted, the allocation rule by means of which a route-specific forwarding information item is allocated to a link leading in the direction of the respective destination network node for each destination network node is setup in the network nodes.

In another aspect of the invention, the network node receiving a setup message the route-specific forwarding information item included in the setup message is replaced by a new route-specific forwarding information item allocated to this route-specific forwarding information item in the network node, by means of which new information item the setup message is then forwarded.

In still another aspect of the invention, the network nodes a new route-specific forwarding information item allocated to a route-specific forwarding information item is determined by access to a translation table in which a new route-specific forwarding information item is included for each permissible route-specific forwarding information item.

In yet another aspect of the invention, during the access to the translation table, the permissible route-specific forwarding information item is used as a table index.

In another aspect of the invention, in one of the network nodes, one of a number of translation tables set up in the network node is selected depending on a connection parameter included in the setup message, and a new route-specific forwarding information item is determined by means of the selected translation table.

In yet another aspect of the invention, in each case the new forwarding information item allocated to a forwarding information item in one of the network nodes is allocated, in the network node connected via the link also allocated and leading in the direction of the respective destination node, as route-specific forwarding information to a link leading in the direction of the same destination network node.

In still another aspect of the invention, the allocation rule is determined and set up in each network node based on information on the structure of the communication network.

In one aspect of the invention, a network nodes, a link allocated to a forwarding information item is determined by access to a link table in which an information item identifying an associated link is included for each permissible forwarding information item.

In another aspect of the invention, during the access to the link table, the permissible route-specific forwarding information item is used as a table index.

In still another aspect of the invention, in one of the network nodes, one of a number of link tables set up in this network node is selected based on a connection parameter included in the setup message and an associated link is determined by means of the selected translation table.

In yet another aspect of the invention, the connection setup takes place in an ATM network.

In another aspect of the invention, a single ATM cell is transmitted as a setup message. In one embodiment of the invention, a system for setting up a connection for a communication network comprising a multiplicity of network nodes networked via links, in which subsequent transmission of useful data along the route of the setup message is prepared by transmitting a setup message from an originating network node to a destination network node, characterized in that a route-specific forwarding information item contained in the setup message is read out in a network node receiving the setup message, and the setup message is forwarded via a link allocated to this route-specific forwarding information item in this network node.

DETAILED DESCRIPTION OF THE INVENTION

Figure 1:
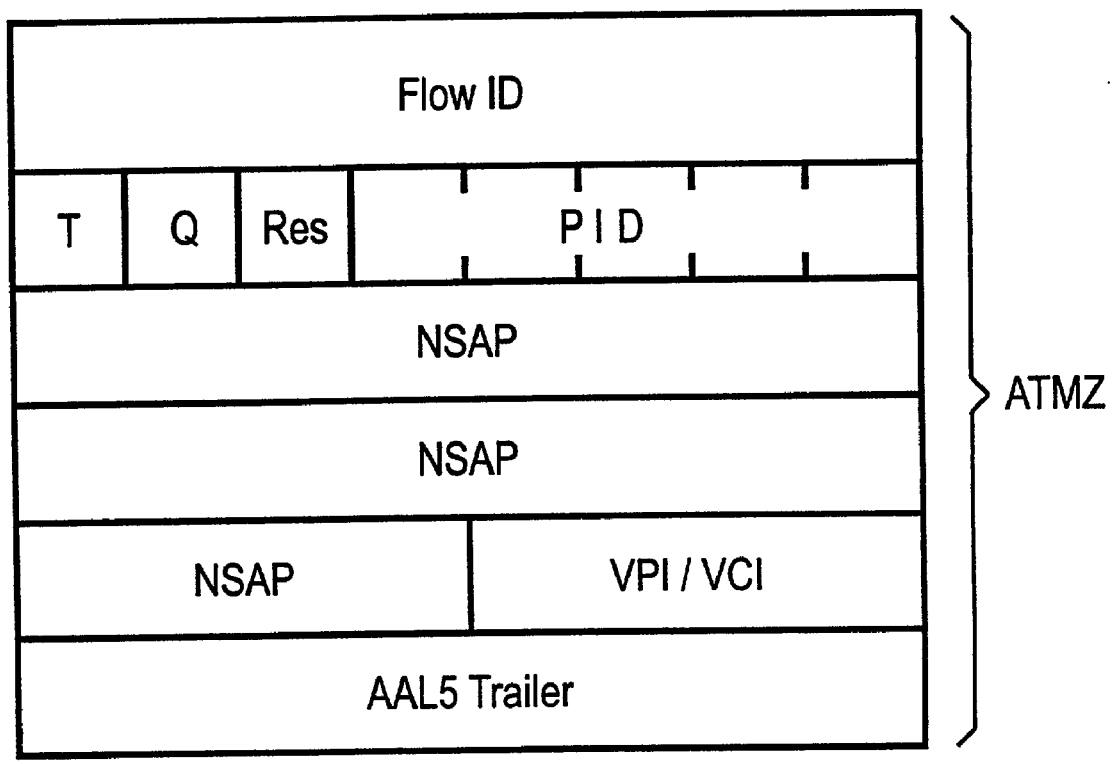
FIG. 1 shows a setup message according to the prior art.
Figure 2:
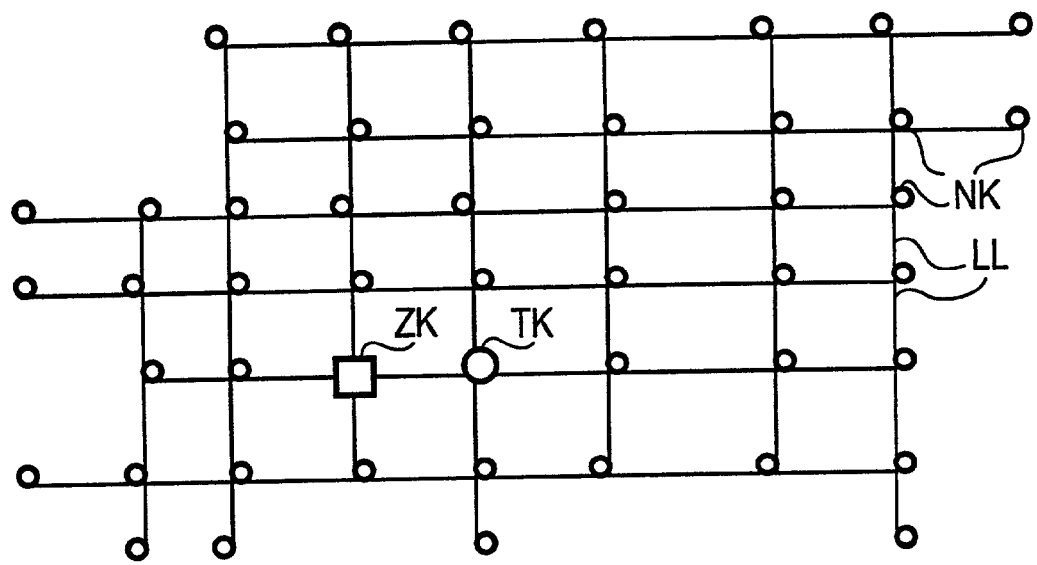
FIG. 2 shows a communication network with a multiplicity of network nodes connected via links.

Before useful data can be transmitted, label switching routers must determined possible routes and sequences of labels describing these routes. The routes are determined in such a manner that, if possible, they combine in a manner of a tree in order to save labels in this manner. Such a route is frequently also-called multipoint-to-point tree (MPT) in this connection. Such an MPT has precisely one root, i.e. one destination node at which terminals with IP addresses from the respective destination IP address range are connected. It is frequently advantageous if a number of MPTs lead to the same destination node and, if necessary, use different paths. Such multiple MPTs can be formed in each case for different transmission parameters such as, e.g. so-called QoS (Quality of Service) attributes.

In the MPLS method, however, the problem remains that a respective originating label switching router must determine the respective first label in a conventional complex manner in order to send an IP data packet to be transmitted via the correct originating link. This is complex especially if specific routes have to be taken into consideration for different transmission parameters or attributes.

Compared with the connectionless data transmission via label switching routers described above, connection-oriented transmission methods for data packets have the advantage that different transmission parameters such as, e.g. the transmission bandwidths to be provided or a maximum permissible transmission period for data packets, of a connection to be set up can be determined by a connection setup message for the connection to be set up which is to be transmitted in advance. In the connection setup message which is frequently also-called setup message, data fields containing various connection parameters, as a rule, are provided for this purpose and are evaluated in the network nodes receiving the setup message. The transmission parameters established by the setup message apply to all data packets to be transmitted in the connection set up and do not therefore need to be specified in each one of these data packets.

Among the connection-oriented transmission methods, ATM (Asynchronous Transfer Mode) technology is becoming increasingly important. ATM technology can be used for transmitting data packet streams in so-called switched virtual connections as fast as in the MPLS method. However, the setting up of a switched virtual connection still takes a relatively long time. Switched virtual connections are frequently also designated by the abbreviation SVC.

At present, a method for setting up ATM connections is being discussed in which a so-called μ setup message having the size of a single ATM cell is transmitted through the ATM network as setup message. This method allows the setup message to be transmitted much more rapidly than in the previously used method for setting up an ATM connection. The setup message is transmitted in accordance with the so-called hop-by-hop principle; i.e. each ATM network node receiving the setup message itself determines the link via which the ATM cell is to be forwarded. As a consequence of the hop-by-hop transmission, however, a μ setup message is still being transmitted much more slowly than a useful data ATM cell in a connection which is set up, in the abovementioned method.

The present invention includes a method for setting up a connection for a communication network which allows rapid transmission of a setup message.

The method according to the invention allows setup messages to be transmitted by a communication network with approximately the same speed as useful data packets transmitted in a connection which has been set up. The advantages of a connection-oriented transmission method can thus be combined with the advantage of a very rapid connection setup.

This results especially in the following advantages for setting up switched virtual connections (SVC):

SVCs can only be set up on demand even with high speed requirements and do not need to be generated in advance for all connections to be expected. Thus, there is no necessity for administering SVCs which have been set up as a precaution which may otherwise be necessary and is expensive.

It is not necessary to reserve any estimated transmission bandwidths in advance as is necessary, for example, in the so-called MPOA (Multiprotocol over ATM), RSVP (Resource Reservation Protocol) or MPLS method in a direct or indirect manner.

In general, there is no loss of quality if several data packet streams are transmitted from the same originating LAN to the same destination LAN (local area network) in a commonly used SVC between an originating router and a destination router.

In general, there is no loss of quality if data packet streams coming from a number of network nodes are combined in the manner of a tree. This makes it possible to replace a setting up of a multipoint-to-point ATM connection preferably by setting up individually requested point-to-point ATM SVCs. The latter are to be preferred especially with regard to a simpler billing procedure.

According to the invention, a slightly modified setup message ATMZ of FIG. 1 is transmitted instead of by hop-by-hop routing by means of a new routing method which will be called pilot routing in the text which follows.

The negotiable VPI/VCI proposal for the useful data packets in the prior art is replaced, according to the invention, by a forwarding information item, called pilot VPI/VCI, for the μ setup method ATMZ itself in the μ setup message ATMZ. The pilot VPI/VCI is used in each transit network node for determining an ongoing link and an ongoing pilot VPI/VCI which are allocated to the received pilot VPI/VCI in the transit network node, within a very short time. For example, a corresponding switching or translation table, preferably a hardware table, can be indexed by a received pilot VPI/VCI. In this manner the μ setup message ATMZ can be transmitted at the speed of useful data ATM cells to the respective destination node.

Before a μ setup message ATMZ is transmitted, an originating node sending the μ setup message ATMZ must determine the destination node by means of the destination address NSAP and then the correct pilot VPI/VCI for the first transmission segment to the immediately following node by means of the destination node.

Before these pilot VPI/VCIs can be determined, the routes along which a μ setup message ATMZ is transmitted to a destination node is first be determined. These routes are generally branched in the manner of a tree—comparable to MPTs in the MPLS method but with the distinction that no data streams are to be combined. As a rule, the routes for a setup message ATMZ are much simpler structures than normal ATM useful data connections since only route-specific information and no connection-specific information plays a role (no service categories, cell rates, etc.). For this reason, these routes can also be set up and cleared down with much simpler means than normal ATM useful data connections as discussed in the text which follows.

Structure of a Pilot VPI/VCI Route Branched in the Manner of a Tree:

To simplify the discussion, an hierarchically flat so-called PNNI (Private network node interface for ATM networks) network is considered as the communication network. This is shown diagrammatically in Figure. The communication network includes a multiplicity of network nodes NK connected via links LL, only a few network nodes being provided with reference symbols for the sake of clarity. One network node ZK and one network node TK are especially marked. The following method sequences described on the example of the network node ZK are correspondingly also performed by the other network nodes NK.

Figure 3:
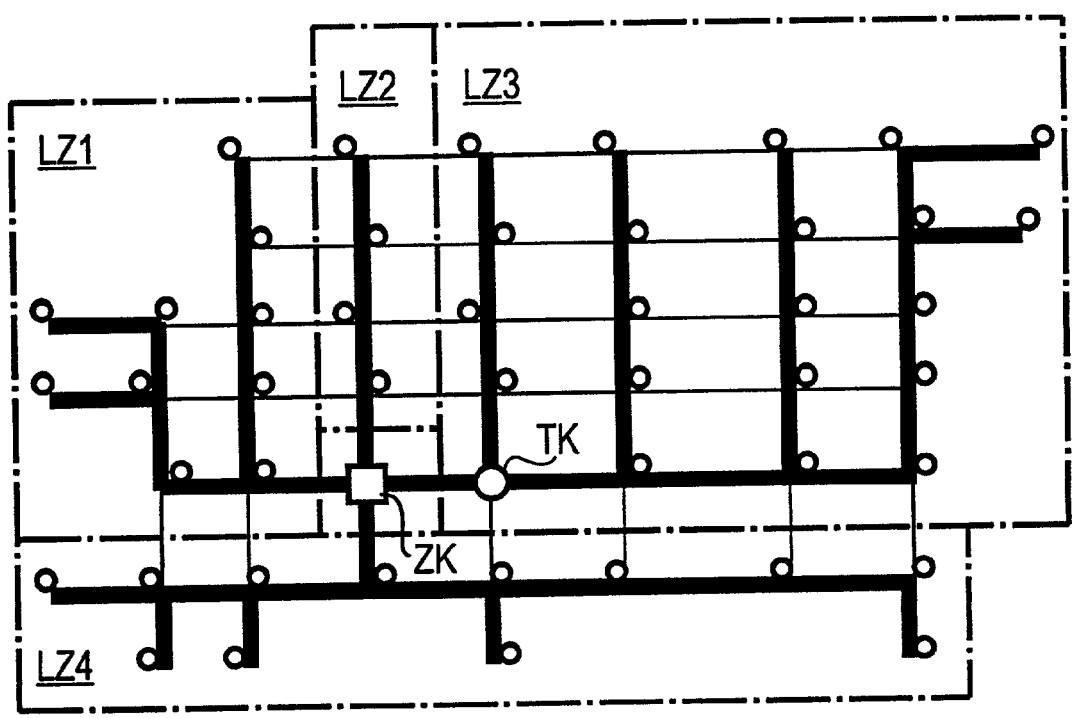
FIG. 3 shows the same communication network with a routing tree assembled from a number of routing branches.

Information on the network structure of the PNNI network is transmitted to the network node ZK by means of the so-called PNNI routing protocol. Using this information, the network node ZK thereupon initiates a setting up of tree-like pilot VPI/VCI concatenations, i.e. sequences of allocations of respective incoming and outgoing pilot VPI/VCIs which are branched in the manner of a tree and which all lead to this node. The tree-like pilot VPI/VCI concatenations correspond to so-called spanning trees and are formed as follows:

The network node ZK initially calculates (e.g. with the aid of the Dijkstra routing algorithm) a routing tree which is assumed to have the form indicated by thickened lines in FIG. 3. The routing tree in this case consists of four different routing branches LZ1, LZ2, LZ3 and LZ4.

After that, the network node ZK sends one setup datagram each (e.g. to be defined in the context of "ATM connectionless") to its neighboring network nodes via the links coming from it. The setup datagram should not be confused with a setup message or μ setup message. The setup datagrams are used for establishing the routes and pilot VPI/VCI concatenations for all possible destination nodes before connections are set up so that setup messages or μ setup messages to be transmitted thereafter can be transmitted very rapidly with the aid of the pilot VPI/VCI concatenations which are then available. A setup datagram has the following content in each case:

Datagram type="setup of a tree-like pilot VPI/VCI route", pilot destination node=ZK, i.e. the network node ZK itself (this information is not changed when the setup datagram is forwarded), pilot VPI/VCI with respect to the respective link via which the setup datagram is just being sent, issued by the emitting node ZK, and source routing information. This depends on the network node receiving the respective setup datagram. For the network node TK, this source routing information consists, e.g., of all (PNNI) links of the routing branch LZ3 (given per network node ID and port ID) without the link between network node ZK and network node TK which has just been passed, and of information elements describing the tree structure of the route.

Furthermore, a formation of a number of routes in dependence on predeterminable connection attributes can be initiated by additional information.

Treatment of the Setup Datagram:

A network node receiving a setup datagram calls up a processing routine which recognizes immediately ongoing links and the source routing information, in each case to be forwarded by these links, of the respective adjoining routing branch, by means of the received source routing information. The network node assigns to each detected ongoing link a "continuation" pilot VPI/VCI and generates entries for the switching table, in such a manner that later, if a μ setup message ATMZ should come to this network node, it can address and evaluate the correct switching table entry in order to forward this μ setup message ATMZ in the direction of the pilot destination node ZK. These table entries can also be concatenated in such a manner that later, when a clear-down datagram for clearing down a pilot VPI/VCI route which has been set up is received from the direction of the pilot destination node ZK, they can be found in a simple manner, evaluated for forwarding the clear-down datagram and finally deleted.

In the present exemplary embodiment, the network node TK receives from the network node ZK a source routing information item which describes the routing branch LZ3.

Figure 4:
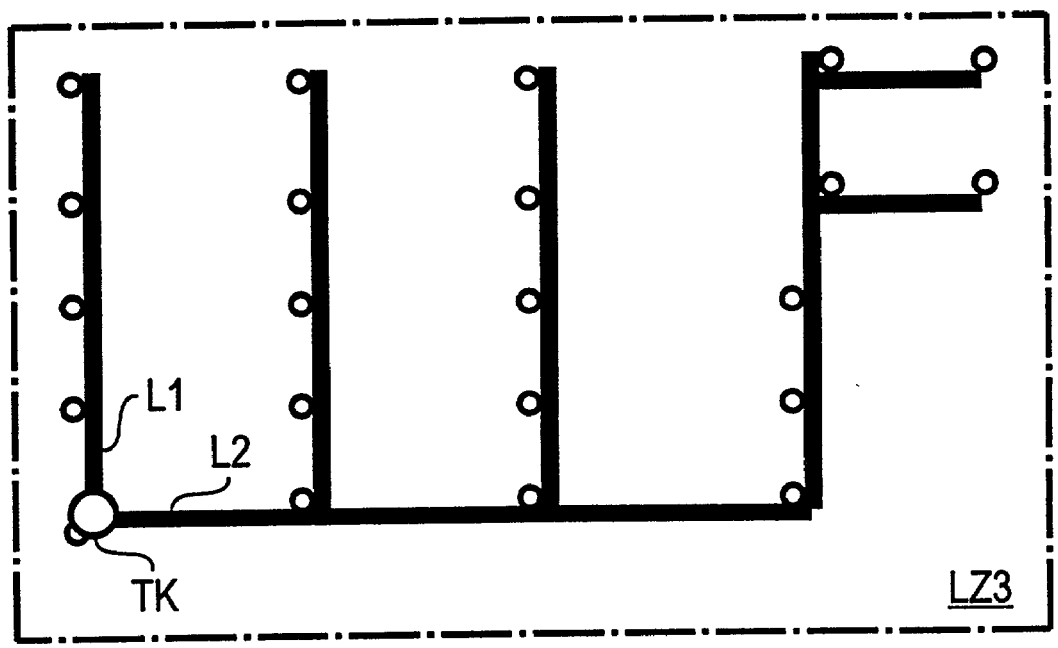
FIG. 4 shows a routing branch of the routing tree.

The routing branch LZ3 is shown in detail in FIG. 4. Using the received source routing information, the network node TK recognizes the links L1 and L2 coming from it as ongoing links and recognizes which part of the received source routing information is in each case to be forwarded via the link L1 or via link L2, respectively.

Figure 5:
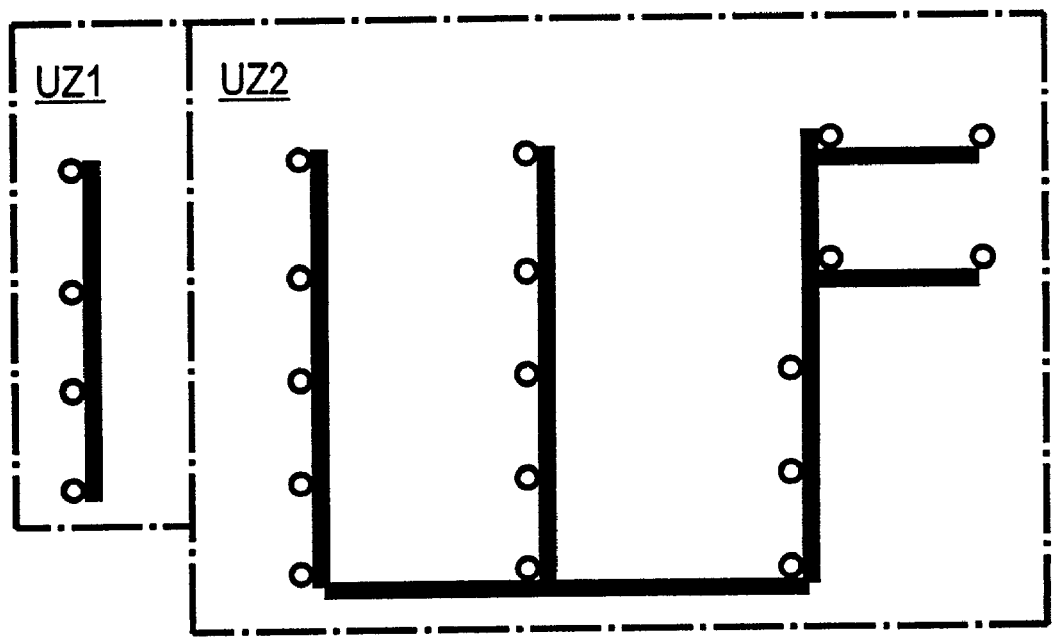
FIG. 5 shows routing branches subordinate to this routing branch.

FIG. 5 illustrates the routing branches UZ1 and UZ2 of routing branch LZ3 in each case adjoining links L1 and L2. From the network node TK, a part of the received source routing information describing the routing branch UZ1 is correspondingly transmitted via link L1 and a part of the received source routing information describing the routing branch UZ2 is transmitted via link L2, in each case in a setup datagram.

The evaluation of the source routing information and of the setup datagram is recursively repeated in all network nodes subsequently receiving the setup datagram. By means of this method, the source routing information and the setup datagram are sent free of loops to all network nodes affected. Differently from the MPLS method, no routing loops need to be feared, therefore.

Clearing Down a Pilot VPI/VCI Route Branched in the Manner of a Tree:

The pilot destination node ZK initiates the clearing down of a pilot VPI/VCI route by sending out a clear-down datagram with the following content via the links coming from it:

datagram type="clear-down of the pilot VPI/VCI route branched in the manner of a tree"

pilot VPI/VCI with respect to the respective link via which the clear-down datagram is currently being sent.

Treatment of the Clear-Down Datagram:

A network node which receives such a clear-down datagram identifies, by means of the link via which the clear-down datagram has been received and by means of the received pilot VPI/VCI, all relevant entries of its switching table. Using these entries, the network node determines the respective continuation links and the respective continuation pilot VPI/VCIs. The network node then forms the respective continuation clear-down datagrams, deletes the switching table entries and finally releases the continuation pilot VPI/VCIs.

Form of the Routing Trees or Spanning Trees:

The routing tree shown in the drawing has been determined by using as a basis information on the entire network structure, with the optimization criterion of specifying the shortest path to the pilot destination node ZK in each case from each network node. µ setup messages ATMZ to be sent out thereafter can thus come from any network node as originating network node and will always be transmitted to the pilot destination node ZK on the shortest path.

However, there are frequently also motives for different routing such as, for example:

a) a link which is temporarily fully occupied, b) a network node marked as so-called non-transit node and c) a so-called call profile which requires that all links to be passed through have certain QoS and/or service category attributes.

Motive a) could have the effect that certain pilot VPI/VCI routes in existence would have to be cleared down from time to time and replaced by other ones newly to be setup.

Motive c) could have the effect that a certain pilot destination node calculates the routing trees leading to it several times and in doing so in each case uses as a basis a network structure in which the (remaining, not "blanked out") links satisfy different QoS and/or service category attributes. In this case, an information element which specifies the correct QoS and/or service category attributes must be provided in the setup datagram. In this case, any originating network node can send µ setup messages with different initial pilot VPI/VCIs in each case allocated to one call profile to the same destination network node.

What is claimed is:

1. A method for setting up a connection for a communication network having a multiplicity of network nodes networked via links, comprising:

determining routes to destination network nodes of connection destinations for the network nodes;

allocating, in the network nodes, an allocation rule based on the determined routes, wherein, based on the allocation rule, a forwarding information item is allocated to a link leading to the destination network node and to a new forwarding information item for each destination network node; and transmitting a setup message from an originating network node to one of the destination network nodes to prepare a subsequent transmission of data, such that a forwarding information item included in the setup message is to be read out, and using the allocation rule, forwarding the setup message via a link allocated to the forwarding information item in the network node, after replacement of the forwarding information item in the setup message by the new forwarding information item allocated to the former forwarding information item.

2. The method as claimed in claim 1, wherein before the setup message is transmitted, the allocation rule is setup in the network nodes.

3. The method as claimed in claim 1 wherein, in a network node receiving a setup message the forwarding information item included in the setup message is replaced by a new forwarding information item allocated to the forwarding information item in the network node, by means of which new information item the setup message is then forwarded.

4. The method as claimed in claim 3, wherein, in one of the network nodes the new forwarding information item allocated to a forwarding information item is determined by access to a translation table in which a new forwarding information item is included for each permissible forwarding information item.

5. The method as claimed in claim 4, wherein during the access to the translation table, the permissible forwarding information item is used as a table index.

6. The method as claimed in claim 4, wherein, in one of the network nodes, one of a number of translation tables set up in the network node is selected depending on a connection parameter included in the setup message, and a new forwarding information item is determined in reference to the selected translation table.

7. The method as claimed in claim 3, wherein in each case the new forwarding information item allocated to a forwarding information item in one of the network nodes is allocated, in the network node connected via the link also allocated and leading in the direction of the respective destination node, as forwarding information to a link leading in the direction of the same destination network node.

8. The method as claimed in claim 2, wherein the allocation rule is determined and set up in each network node based on information on the structure of the communication network.

9. The method as claimed in claim 2, wherein in one of the a network nodes, a link allocated to a forwarding information item is determined by access to a link table in which an information item identifying an associated link is included for each permissible forwarding information item.

10. The method as claimed in claim 9, wherein during the access to the link table, the permissible route-specific forwarding information item is used as a table index.

11. The method as claimed in claim 9, wherein in one of the network nodes, one of a number of link tables set up in this network node is selected based on a connection parameter included in the setup message, and an associated link is determined by means of the selected translation table.

12. The method as claimed in claim 9, wherein the connection setup takes place in an ATM network.

13. The method as claimed in claim 12, wherein a single ATM cell is transmitted as a setup message.

14. A system for setting up a connection for a communication network having a multiplicity of network nodes networked via links, comprising:
- routes leading to destination network nodes for the network nodes;
- an allocation rule, in the network nodes, based on the routes determined, wherein, based on the allocation rule, a forwarding information item is allocated to a link to the destination network node and to a new forwarding information item for each destination network node; and
- a setup message transmitted from an originating network node to the destination network nodes to prepare a subsequent transmission of data, such that in a network node receiving the setup message,
- a forwarding information item included in the setup message is read out, and
- using the allocation rule, the setup message is forwarded via a link allocated to this forwarding information item in this network node, after replacement of this forwarding information item by the new forwarding information item allocated to the former forwarding information item.

* * * * *